US008531825B2

(12) United States Patent
U et al.

(10) Patent No.: US 8,531,825 B2
(45) Date of Patent: Sep. 10, 2013

(54) INDICATOR SECURING STRUCTURE

(75) Inventors: To U, Tokyo (JP); Hideyuki Hirota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 275 days.

(21) Appl. No.: 13/139,879

(22) PCT Filed: Dec. 18, 2009

(86) PCT No.: PCT/JP2009/007015
§ 371 (c)(1), (2), (4) Date: Jun. 15, 2011

(87) PCT Pub. No.: WO2010/113235
PCT Pub. Date: Oct. 7, 2010

(65) Prior Publication Data

US 2011/0249387 A1 Oct. 13, 2011

(30) Foreign Application Priority Data

Mar. 31, 2009 (JP) ................................ 2009-086437

(51) Int. Cl.
*G06F 1/16* (2006.01)

(52) U.S. Cl.
USPC .................... 361/679.21; 361/679.29; 349/60

(58) Field of Classification Search
USPC ............... 361/679.21, 679.26, 679.29, 679.3; 349/58, 60
See application file for complete search history.

(56) References Cited

U.S. PATENT DOCUMENTS

| | | | | |
|---|---|---|---|---|
| 5,270,847 | A * | 12/1993 | Sano | 349/60 |
| 6,034,751 | A | 3/2000 | Kamiya | |
| 6,064,453 | A * | 5/2000 | Inubushi et al. | 349/58 |
| 6,809,916 | B2 * | 10/2004 | Nakata et al. | 361/115 |
| 6,909,475 | B2 * | 6/2005 | Kojima et al. | 349/58 |
| 7,006,170 | B2 * | 2/2006 | Inoue | 349/60 |
| 2003/0184514 | A1 | 10/2003 | Grosfeld et al. | |
| 2009/0316434 | A1 | 12/2009 | Ohno | |

FOREIGN PATENT DOCUMENTS

| | | | |
|---|---|---|---|
| JP | 5-30833 | U | 4/1993 |
| JP | 9-288455 | A | 11/1997 |
| JP | 10-22665 | A | 1/1998 |
| JP | 10-78756 | A | 3/1998 |
| JP | 11-242447 | A | 9/1999 |
| JP | 2000-4087 | A | 1/2000 |
| JP | 2001-34191 | A | 2/2001 |
| JP | 2001-175608 | A | 6/2001 |
| JP | 2003-296023 | A | 10/2003 |
| JP | 2004-109734 | A | 4/2004 |

(Continued)

*Primary Examiner* — Ramon Barrera
(74) *Attorney, Agent, or Firm* — Birch, Stewart, Kolasch & Birch, LLP

(57) ABSTRACT

A display securing structure includes a rectangular display 4 with thickness including a terminal, and a holder 9 assembled by the display 4; the holder 9 includes a resilient lug 91 serving as a thickness-directionally urging member, formed on a bottom plate of the holder to urge the display 4 mounted thereon in the direction of thickness; a resilient lug 92 working as a downwardly urging member, formed on an upper side plate thereof to urge the display 4 to the side of the terminal; resilient lugs 93 serving as a rightwardly and leftward urging member, formed on left and right side plates thereof so as to urge the display 4 from left and right; and resiliently engaging claws 94 and 95 working as a face pressing member, formed on a backside plate and the right and left side plates thereof to press the face of the display 4.

3 Claims, 5 Drawing Sheets

(56) References Cited

FOREIGN PATENT DOCUMENTS

| | | | |
|---|---|---|---|
| JP | 2005-77755 | A | 3/2005 |
| JP | 2005-189448 | A | 7/2005 |
| JP | 2005-283826 | A | 10/2005 |
| JP | 2006-309986 | A | 11/2006 |

* cited by examiner

INDICATOR SECURING STRUCTURE

TECHNICAL FIELD

The present invention relates to a display securing structure for securing a display having a terminal, for example, a heavyweight display such as a vacuum fluorescent tube in an electric apparatus.

BACKGROUND ART

Conventionally, in an electric apparatus mounted on a moving body such as a motor vehicle, a display or indicator is fixed thereto only in two directions, in the thickness direction of the display and in the vertical direction thereof by a holder. In such a securing structure, a lightweight display having a terminal can endure vibration and impact; however, a misregistration may occur in a heavyweight display having a terminal such as a vacuum fluorescent because of vibration, impact and so on to cause a broken terminal thereof.

Further, for example, Patent Document 1 discloses a box-type of LCD holder and an electronic apparatus using the holder: positioning ribs for positioning an LCD are provided at four corners of an upper face of the LCD holder to be mounted thereon by the LCD, and also urging sections for urging the LCD are provided with extending from one side of the LCD holder and urge the LCD toward the other side thereof opposing the one side to be secured.

PRIOR ART DOCUMENTS

Patent Documents

Patent Document 1: JP-A-2000-004087

SUMMARY OF THE INVENTION

However, although the structure disclosed in Patent Document 1 can prevent a large misregistration of the LCD, there is a problem such that when a heavyweight display having a terminal is secured, a misregistration thereof can be caused due to vibration, impact and so on; the occurrence of a broken terminal because of the misregistration cannot be suppressed.

The present invention has been made to solve the above-mentioned problems, and an object of the present invention is to achieve a display securing structure with a great ability to be assembled, such that specific forces are exerted on a display from three directions to secure surely the display to a holder, thus preventing a misregistration of the display because of vibration, impact and so on, and also preventing a terminal thereof from being broken.

A display securing structure according to the present invention includes: a display having a terminal, and a holder to which the display is assembled, wherein the display has a rectangular shape with a thickness, and wherein the holder includes a thickness-directionally urging unit formed on a bottom plate of the holder to urge the display mounted thereon in the direction of thickness of the display; a mono-directionally urging unit formed on a backside plate thereof to urge the display to the side of the terminal; a rightwardly and leftwardly urging unit formed on a left and a right side plates thereof to urge the display from left and right; and a face pressing unit formed on the backside plate and the right and the left side plates to press the face of the display.

According to the present invention, it is arranged that a display mounted on a holder be urged by urging unit having resiliency from three directions, to be more specific, in the thickness direction, an upward and downward direction, and a rightward and leftward direction, and further the face the display is pressed against the thickness-directionally urging force. Thus, a heavyweight display having a terminal can be firmly secured to a holder. Moreover, even if the display is subjected to vibration and impact, the display can be restrained from movement, and the occurrence of a broken terminal due to a misregistration of the display can be prevented. Furthermore, since the display is urged by urging units with resiliency, there are obtained an advantageous effect that variations in size and assembly can be accommodated and other effects.

BEST MODE FOR CARRYING OUT THE INVENTION

Embodiments of the present invention will now be described with reference to the accompanying drawings in order to explain the present invention in more detail.

First Embodiment

Figure 1:
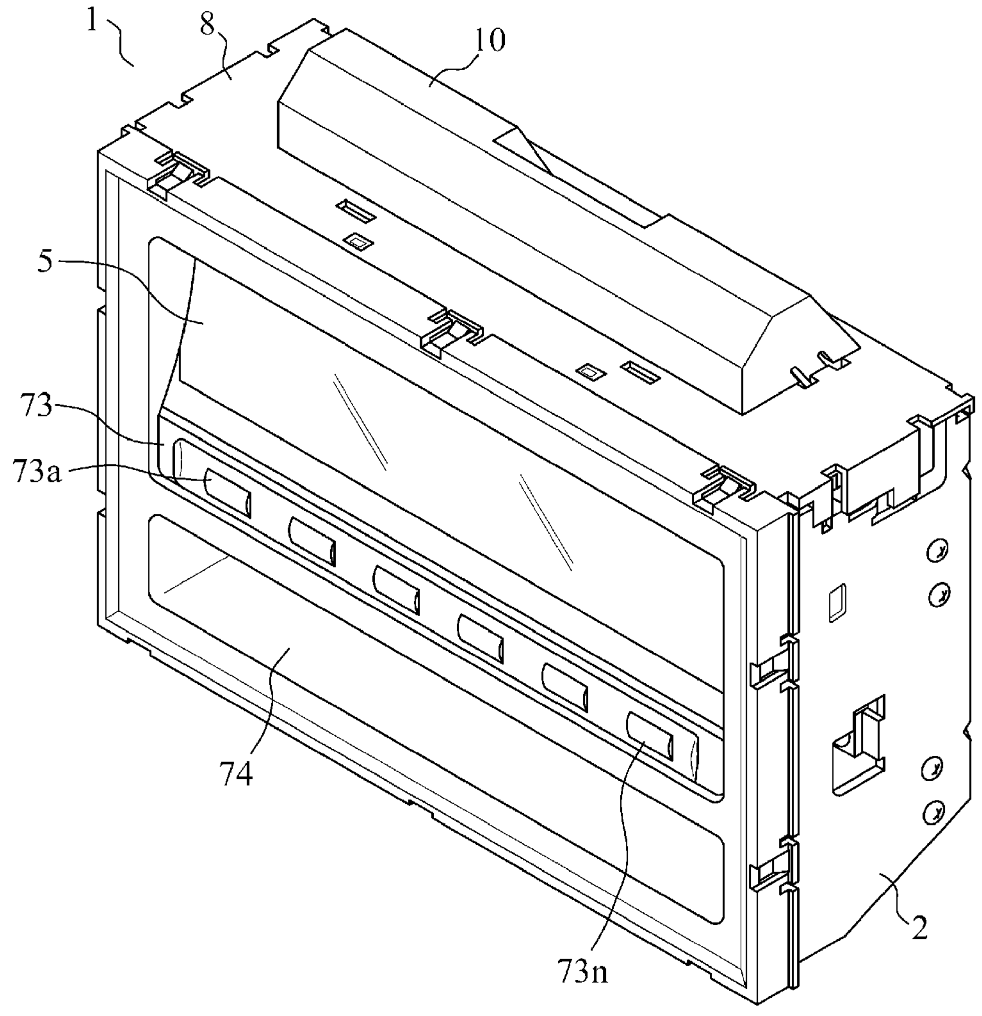
FIG. 1 is a schematic view of an electronic apparatus to which a display securing structure according to the present invention is applied.

In the following, a display securing structure according to the present invention will be described with reference to the drawings. First, the outline of an electronic apparatus to which the display securing structure according to the invention is applied will be discussed based on FIG. 1 and FIG. 2. An electronic apparatus 1 includes: a box-shaped and hollow chassis 2; a board 3 to be assembled to the interior of the chassis 2; a display or indicator 4 to be assembled to the board 3 through a holder 9; a panel 7 to be assembled to the chassis 2, while a filter 5 disposed opposite the display 4 is attached thereto together with a hood 6; and a cover 8 for covering the opening of the chassis 2 after assembling all of the above parts. Note that in the following descriptions, expressions of "upper and lower side plates, " "front and back side plates, " and also "right and left side plates" are based on a state where the electronic apparatus 1 is disposed at an in-service position.

The chassis 2 includes: a screw fixing section (also serving as a board receiver) 21 provided in the interior thereof; a first board receiving section 22 that is formed at the same height position as that of the screw fixing section (also serving as a board receiver) 21 by cutting and raising inwardly a portion of each side plate of the chassis 2; board gripping sections **23*a*, 23*b* (one of the sections is not shown) that are formed so as to grip the board 3 by cutting and raising inwardly another portion of each side plate of the chassis 2; a board assembling guide section 24 that is formed by folding a portion of the first board receiving section 22 at a substantially right angle toward the board mounting side; and a rectangular opening engaging section 25 formed by turning at a substantially right angle at the upper edge of the back side plate of the chassis 2 so as to engage with a protrusion 31 formed at the edge of the board that is not screw-fixed, and also a second board receiving section 26 that is formed by horizontally extending from each side of the rectangular opening engaging section toward the interior of the chassis and formed at the substantially same height position as those of the screw fixing section (also serving as a board receiver) 21 and the first board receiving section 22**.

Further, the chassis 2 is formed of an L-shaped hooking section 27 formed by bending inwardly a portion of a cover mounting opening end of each side plate thereof; an assembly guide section 28 dimpling inwardly the side of the opening end of the chassis 2 by the thickness of the cover 8 in the vicinity of the hooking section 27; and a tapped hole 101 and an engaging hole 102 formed through the upper part of the back side plate thereof.

The display 4 has a rectangular shape with a thickness. A holder 9 for holding the display 4 assembled thereto is made of a resin material, and includes: resilient lugs 91 serving as a thickness-directionally urging unit, and formed on the bottom face by cutting and raising a portion of the bottom face so as to urge the display 4 mounted thereon in the direction of thickness; resilient lugs 92 working as a downwardly urging unit, and formed by cutting and raising inwardly a portion of the upper side plate so as to urge the display 4 toward the terminal side; resilient lugs 93 working as a sandwiching unit, and formed by cutting and raising inwardly a portion of each of the right and the left side plates so as to sandwich the display 4 from right and left; and resiliently engaging claws 94 and 95 serving as a surface pressing unit, and formed on the upper side plate, and also the right and the left side plates so as to press the surface of the display 4.

Also, resiliently engaging claws 96 and 97 for assembling and fixing the holder 9 to the board 3 are formed on the back side plate and the right and left side plates of the holder 9 by extending in the direction of thickness. Further, engaging claws for engaging with holes of the board 3 are formed on the bottom face thereof; however, indications thereof will be omitted in FIG. 2.

The panel 7 includes an assembling wall 70 relative to the chassis 2 therearound, and has a display window 71 that is formed inside a predetermined distance away from the upper side plate forming the wall 70; a filter mounting section 72 formed in the shape of a frame on the fringe of the display window 71; an operation button housing section 73 for housing a plurality of operation buttons 73*a* to 73*n* that are formed along the lower edge of the filter mounting section 72; and a glove compartment 74 that is formed and positioned between the operation button housing section 73 and the lower side plate of the wall 70. The upper and the lower side plates and the right and the left side plates forming the assembling wall 70 are provided with rectangular opening engaging sections 70*a* for engaging with the engaging claws formed on the chassis 2.

The hood 6 is made of a resin material in the shape of a frame, and has cover sections 61 and engaging holes 62 on the upper frame side plate thereof that is assembled to the outer face of the upper side plate of the filter mounting section 72. Further, the hood 6 has on the lower frame side plate thereof resilient press sections 63 that are formed by projecting at a specific interval so as to abut against the bottom face of the operation buttons, and engaging projections (not shown) for engaging in engaging concavities 80 (not shown).

The filter 5 is formed with a curved face so as to conform to the filter mounting section 72. At the upper end edge of the filter, there is provided with hooking resiliently engaging claws 51 having a taper and formed at a specific interval so as to engage with rectangular opening engaging sections (omitted in FIG. 2) of the panel 7; and concavities 54 formed at the positions with which the protrusions (omitted in FIG. 2) formed in the filter mounting section 72 is engaged, while at the lower end edge thereof, there is provided with engaging claws 52 and positioning convexities 53 formed so as to engage with the resiliently engaging claws 75 and the positioning concavities 76 formed on the outer face of the operation button housing section 73, respectively.

In the cover 8, hooking claws 81 for engaging with the L-shaped hooking sections 27 of the chassis 2; and guide lugs 82 for engaging with the assembly guide sections 28 are formed in the cover 8, with extending from the upper end edge of each side plate of the cover in the assembling direction, and also the cover has a right-angularly bent lug 83 to be superposed on the outer face of the back side plate of the chassis 2; screw passing holes (omitted in FIG. 2) opposed to the tapped holes 101 of the chassis; and engaging claws 85 for engaging with the engaging holes 102. It is preferable to provide a taper 85*a* on the engaging claw 85 such that the engaging claw easily engages with the engaging hole 102. Further, four corners of the engaging hole 102 are arranged to have a circular arc portion and a circular arc portion 102*a* thereof (see FIG. 5) is normally caused to come in contact with the engaging claw 85.

Figure 2:
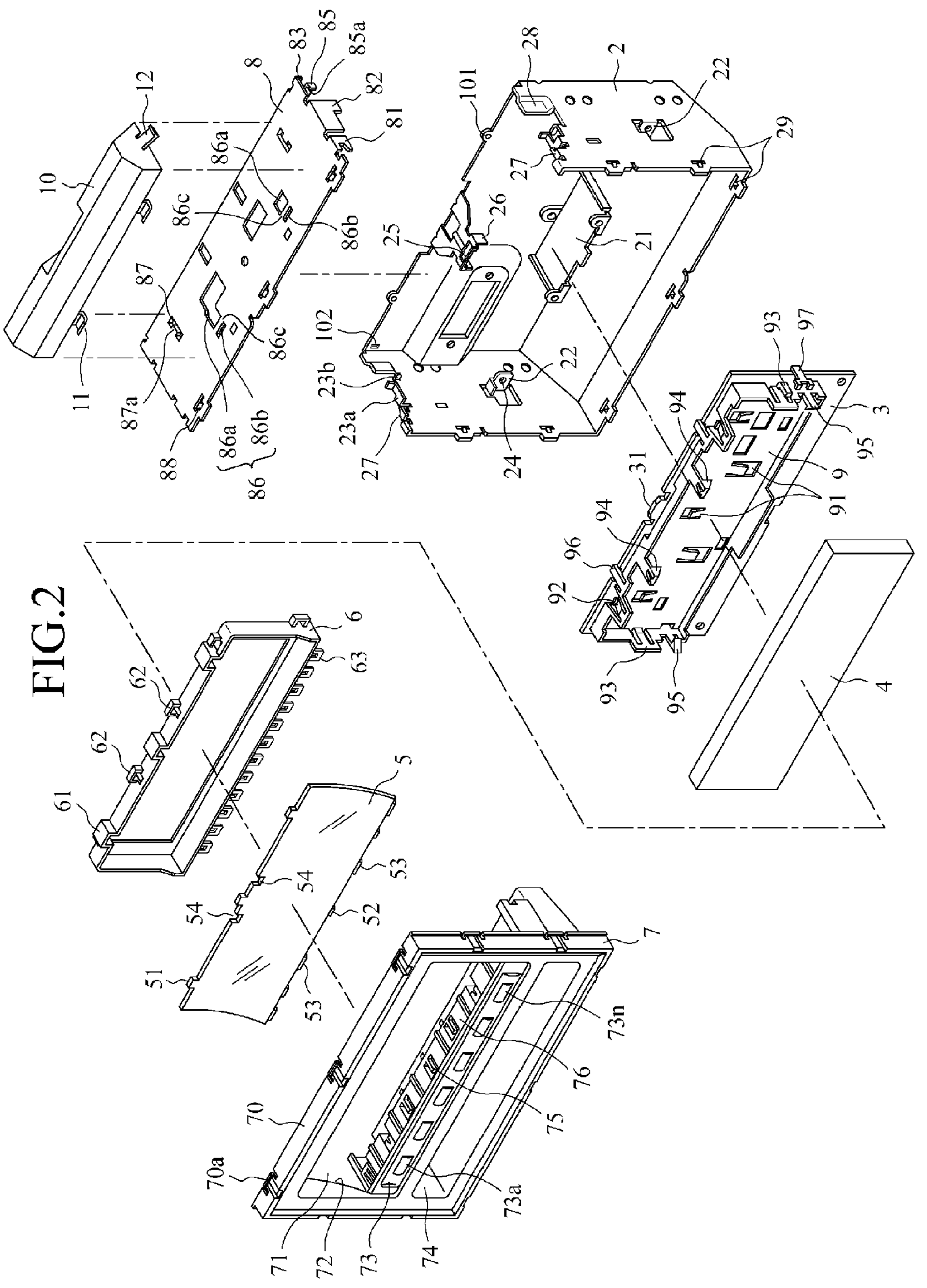
FIG. 2 is an exploded perspective view of the electronic apparatus.

The engagement faces between the hooking section 27 and the hooking claw 81 are provided with tapers (not shown in FIG. 2) such that the chassis 2 and the cover 8 impart a pressing force to each other, and the terminal portions of the tapers are formed in the shape of a circular arc (not shown in FIG. 2). Further, the cover 8 includes engaging hole sections 86 formed by juxtaposing two holes 86*a*, 86*b* and engaging lugs 87*a* formed by extending downwardly one side of the edges of a cut-raised hole 87.

On the other hand, in a case 10 assembled to the cover 8, substantially U-shaped resiliently engaging claws 11 also serving as a positioner to engage with the engaging hole sections 86 of the cover 8; and resiliently engaging claws 12 extending downward so as to pass through the cut-raised hole 87 of the cover 8 and normally engage with the lower end of the engaging lug 87*a* are formed at the opening end edge of the case 10 to be opposite thereto.

In the following, assembly of the parts will be described. To assemble the display 4 to the holder 9, as the display 4 is pressed to the holder 9 from the top face thereof, the display 4 advances while outwardly pressing and widening the resilient lugs 92, the resilient lugs 93, and the resiliently engaging claws 94 and 95, and further advances while depressing the resilient lugs 91. Further, as the display 4 passes therethrough, the resilient lugs 92 urge the display 4 to a terminal side, the resilient lugs 93 sandwich the display 4 from right and left, and the resiliently engaging claws 94 and 95 press and maintain the face of the display 4 to be forced upwardly by the urging force of the resilient lugs 91, thus completing the assembly of the display 4 to the holder 9. After completing the assembly (the following processes may be performed before the assembly of the display), the holder 9 is assembled to the board 3 with the resiliently engaging claws 96 and 97, and the engaging claws (not depicted) as shown FIG. 2.

Next, the board 3 having the display 4 assembled thereto is mounted on the first board receiving sections 22 formed on each side plate of the chassis 2 to be moved in the assembling direction and be sandwiched at both side edges thereof by the board gripping sections 23*a*, 23*b*. At the movement terminated position, the board 3 is mounted on the second board receiving section 26 at the moving front end thereof, and the protrusion 31 formed at the end edge of the board that is not screw-fixed enters the rectangular opening engaging section 25. In this state, the board 3 is mounted on the screw fixing section (also serving as a board receiver) 21 at the back end side thereof to be screw-fixed.

On the other hand, to assemble the cover 8 to the opening of the upper face of the chassis 2, the guide lug 82 of the cover 8 is moved along the assembly guide section 28 of the chassis 2 to cause the cover 8 to abut against the opening end face of the chassis 2, thus preventing the cover 8 drawn too much to the chassis side to be lowered.

Then, the cover 8 is moved until the right-angularly bent lug 83 abuts against the outer face of the back side plate of the chassis 2 in a state where the cover is abutted against the opening end face thereof to thereby engage the hooking section 27 with the hooking claw 8, and then adjust these lateral and vertical positions to be in mesh with each other. In this case, since the hooking section 27 and the hooking claw 81 are formed with a taper such that an entrance thereof widen and a root thereof narrow, the hooking section and the hooking claw are easily combined to each other, and also they can be firmly secured to each other in the combined state. Further, by providing circular arc portions at the roots of the hooking section 27 and the hooking claw 81, respectively, the hooking section 27 and the hooking claw 81 are caused to normally come in contact with each other, thus enabling the two engaging members to be maintained at tension.

Further, as the right-angularly bent lug 83 of the cover 8 is abutted against the outer face of the back side plate of the chassis 2 to be superposed, the engaging claw 85 formed at the right-angularly bent lug 83 engages with the engaging hole 102 of the back side plate of the chassis 2, and thereby the cover 8 is positioned and held to the chassis 2. Therefore, while maintaining this state, a screw (omitted in FIG. 2) passed through the screw passing hole of the right-angularly bent lug 83 is screwed into the tapped hole 101 of the chassis 2 to be screw-fixed. In this case, the engaging claw 85 has the taper, and the four corners of the engaging hole 102 are formed with a circular arc portion. Thus, the engaging claw 85 is easily inserted into the engaging hole 102, the engaging claw 85 is normally in contact with the corner of the circular arc portion of the engaging hole 102, and the back plate of the chassis 2 is gripped between the cover 8 and the engaging claw 85, thus enabling the cover and the chassis to be maintained at tension.

On the other hand, to assemble the filter 5 to the panel 7, as the hooking engaging claw 51 of the filter 5 is first engaged with the rectangular opening engaging section 70*a* (not shown) of the panel 7 to press the side of the lower end of the filter against the one of the panel, the resiliently engaging claw 52 engages with the engaging claw 75 on the side of the panel in this process, and also the positioning convexity 53 engages with a positioning concavity 76 on the side of the panel, thus assembling the filter 5 to the panel 7.

After assembling the filter, the peripheral portion of the hood 6 is fitted in an L-shaped drawing positioning section (not shown) on the side of the panel, such that the peripheral portion of the filter is covered, and that engaging claws (not shown) on the side of the panel are engaged with the engaging holes 62. This assembly causes the cover sections 61 to cover rectangular opening engaging sections (not shown) located on the side of the panel, and the resilient pressing sections 63 abut against the bottom faces of the operation buttons 73*a*-73*n* to impart a restoring force to the operation buttons.

The wall 70 of the panel 7, to which the filter 5 and the hood 6 have been thus assembled, is fitted in the front opening of the chassis 2 having the board 3 assembled thereto as discussed above, and cut-raised engaging claws 29 formed on the chassis 2 and cut-raised engaging claws 88 of the cover 8 are engaged with the rectangular opening engaging sections 70*a* formed on the wall 70, thus completing the assembly of the electronic apparatus 1.

Moreover, before the assembly or after the completion of the assembly as mentioned above, the case 10 is assembled and fixed to the cover 8. In this case, the substantially U-shaped resiliently engaging claws 11 of the case 10 are inserted from the holes 86*a* on the upper face of the cover 8, further the case 10 is rotated from this state to the side of the cover 8 to thereby insert the tip portions of the resiliently engaging claws 11 into the holes 86*b* from the lower face of each of partition sections 86*c* between the holes 86*a*, 86*b* to thus perform these positionings in a lateral direction, and then the engaging claws 12 are inserted into the cut-raised holes 87 to be engaged with the engaging lugs 87*a*, thus enabling the case 10 to be firmly assembled to the cover 8 without screws.

Figure 3:
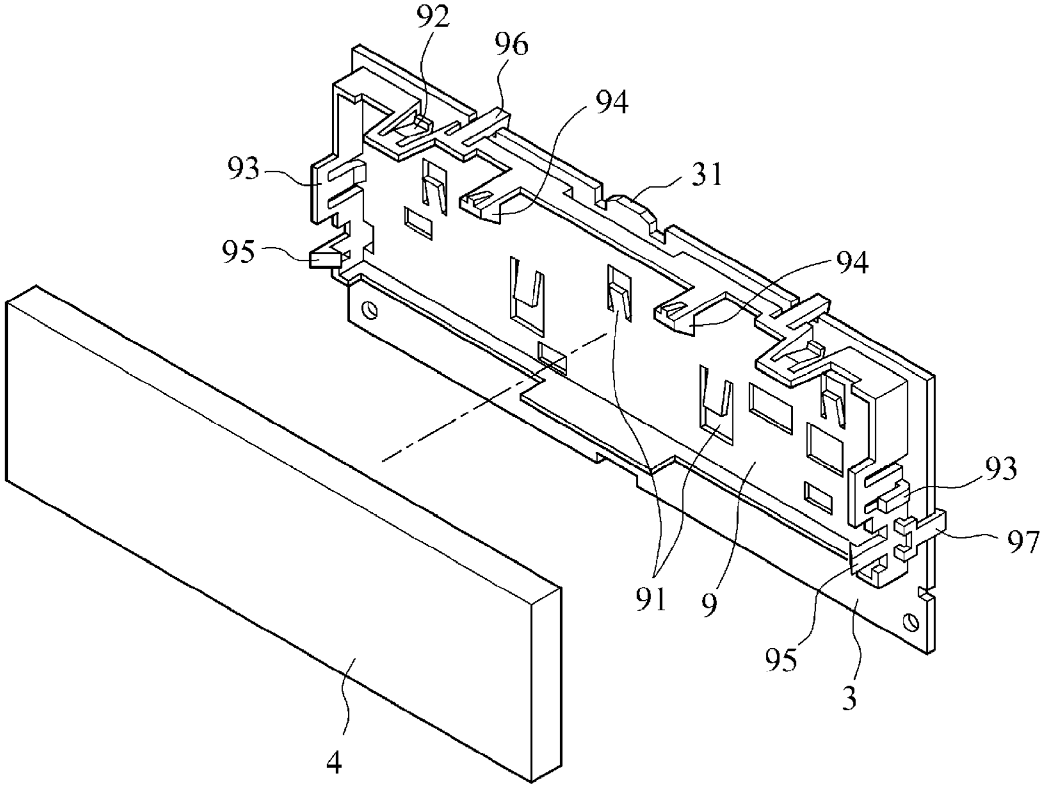
FIG. 3 is a perspective view showing a relationship between a display before being assembled and a holder.
Figure 7:
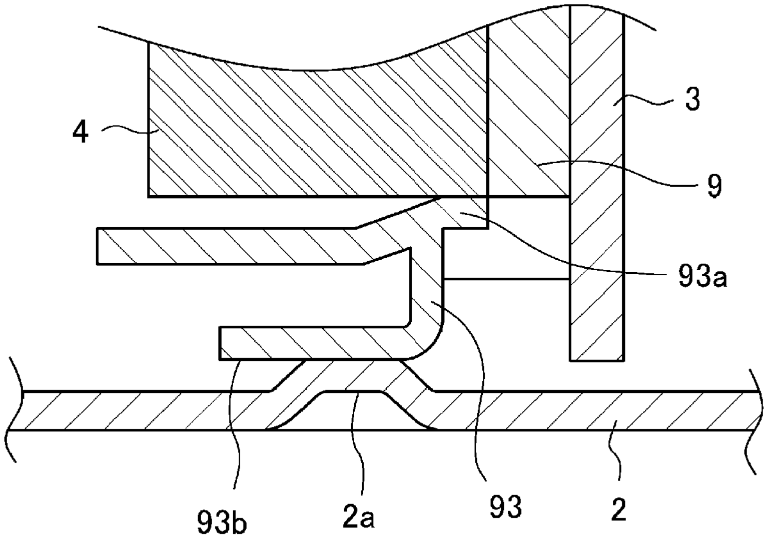
FIG. 7 is an enlarged sectional view along the line B-B of FIG. 5.
Figure 8:
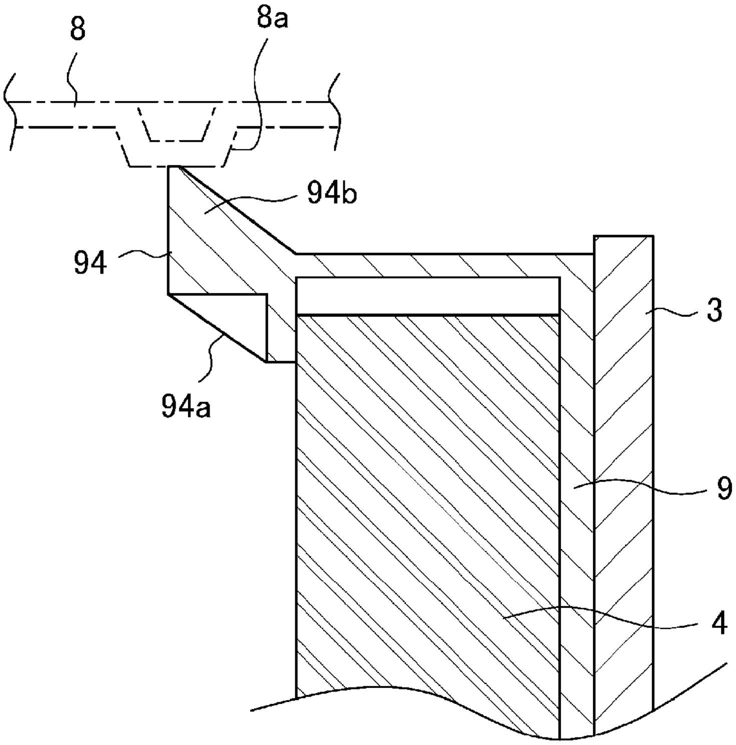
FIG. 8 is an enlarged sectional view along the line C-C of FIG. 4.

According to the present invention, the electronic apparatus thus arranged is contrived such that a display including a plurality of terminals, for instance, a heavyweight display such as a vacuum fluorescent tube will be firmly assembled to a holder with an favorable ability to be assembled. FIG. 3 is a perspective view showing a relationship between a display and a holder before assembly, FIG. 4 is a perspective view showing a state where the display is assembled to a board through the holder, FIG. 5 is a perspective view showing a state where the board is assembled to a chassis, FIG. 6 is an enlarged sectional view along the line A-A of FIG. 4, FIG. 7 is an enlarged sectional view along the line B-B of FIG. 5, and FIG. 8 is an enlarged sectional view along the line C-C of FIG. 4.

The display 4 in the display securing structure according to the present invention has a rectangular shape with a thickness. The holder 9 for holding the display 4 is made of a resin material, and includes the resilient lugs 91 serving as the thickness-directionally urging unit, and formed on the bottom plate of the holder by cutting and turning a portion of the bottom plate so as to urge the display 4 mounted thereon in the direction of thickness; the resilient lugs 92 working as the downwardly urging unit in the downward direction and formed on the upper side plate of the holder by cutting and inwardly turning a portion of the upper side plate so as to urge the display 4 toward the terminal side; the resilient lugs 93 working as the rightwardly and leftwardly urging unit, which are formed on the left and the right side plates thereof as by cutting and inwardly turning a portion of each of the left and the right side plates so as to urge the display 4 from left and right; and the resiliently engaging claws 94 and 95 serving as the face pressing unit that are formed on the upper side plate and the right and left side plates so as to press the face of the display 4.

Figure 4:
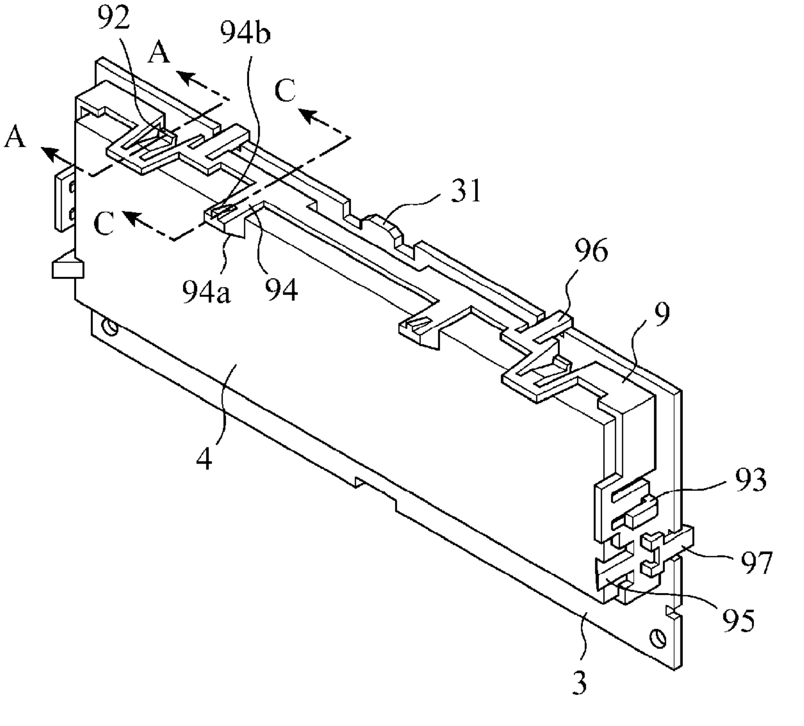
FIG. 4 is a perspective view showing a state where the display is assembled to a board through the holder.
Figure 5:
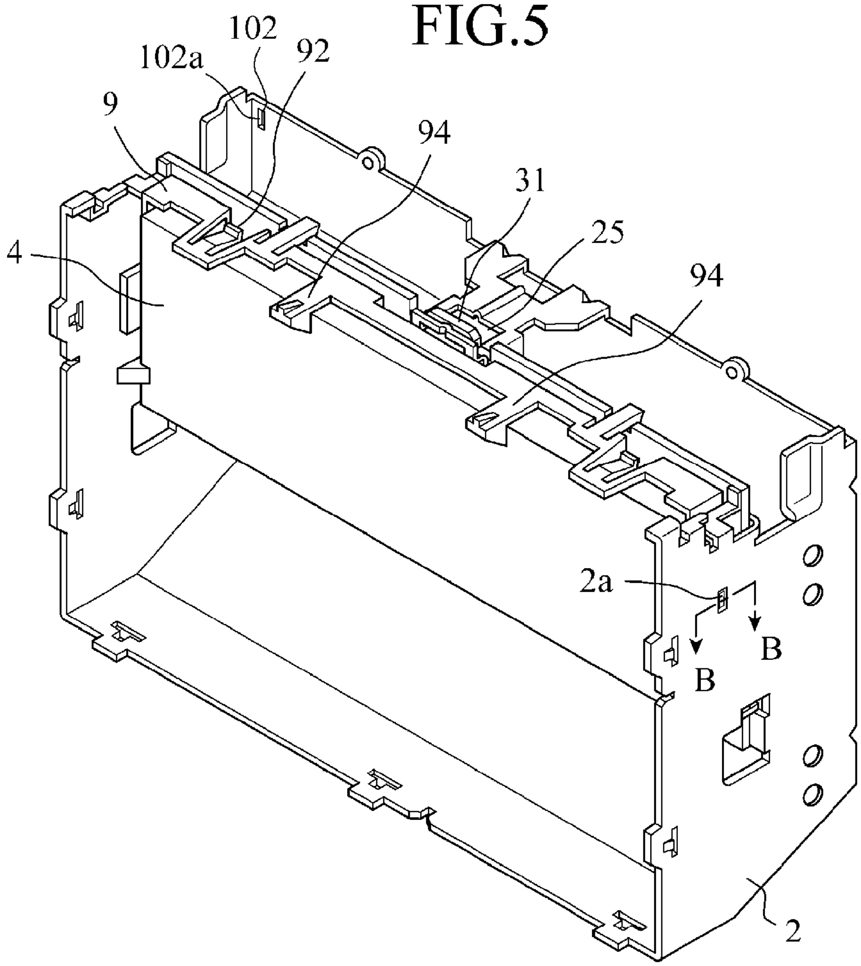
FIG. 5 is a perspective view showing a state where the board is assembled to a chassis.
Figure 6:
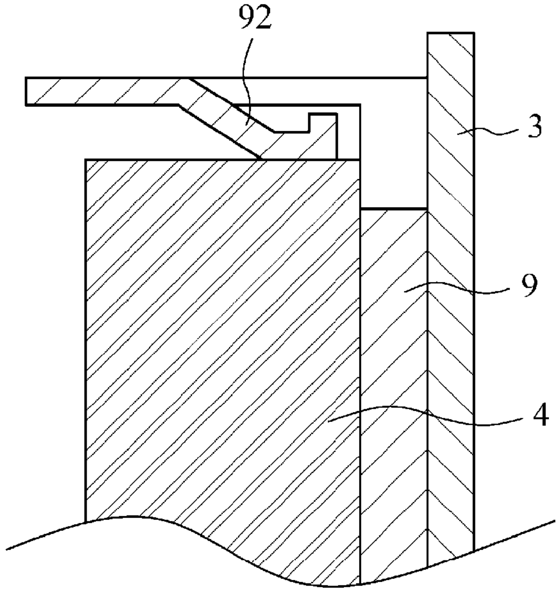
FIG. 6 is an enlarged sectional view along the line A-A of FIG. 4.

Further, as is apparent from the enlarged sectional view along the line A-A of FIG. 4 as shown in FIG. 6, the resilient lug 92 is formed on the upper side plate by cutting and inwardly turning a portion of the upper side plate. As is clear from the enlarged sectional view along the line B-B of FIG. 5 as shown in FIG. 7, the resilient lug 93 is constituted in a U-shape by a resilient lug section 93*a* for abutting against the display 4 and a turned lug 93*b* that extends from the resilient lug section and is outwardly turned. Moreover, as is apparent from the enlarged sectional view along the line C-C of FIG. 4 as shown in FIG. 8, the resilient engaging claws 94 and 95 are formed into acclivities 94*a* and 95*b*, respectively, from the respective tip portions of the resilient engaging claws 94 and 95 for pressing the face of the display 4, and a projection section 94*b* is formed on the outer face of the specific resilient engaging claw 94.

Resiliently engaging claws 96 and 97 for assembling and fixing the holder 9 on the board 3 are formed on the backside plate and the right and the left side plates of the holder 9 with extending in the direction of thickness thereof. Further, an engaging claw for engaging with a hole of the board 3 to be attached to the board is formed on the outer face of the backside plate thereof; however, the illustration will be omitted in the figure.

From the above construction, as the display 4 is pressed to the holder 9 from the top face thereof, the display 4 advances while outwardly pressing and widening the resilient lugs 92, the resilient lugs 93, the resilient engaging claws 94 and 95, and further advances while depressing the resilient lugs 91. Further, as the display 4 passes therethrough, the resilient lugs 92 urge the display 4 to the side of the terminal, the resilient lugs 93 urge the display 4 from right and left, and the resilient engaging claws 94 and 95 press and maintain the face of the display 4 upwardly forced by the urging force of the resilient lugs 91, thus completing the assembly of the display 4 to the holder 9.

After this completion (the following may be performed before assembly of the display), the holder 9 is assembled to the board 3 by the resilient engaging claws 96 and 97, and the engaging claws (not depicted), as shown in FIG. 2 and FIG. 4.

As the above, when the board 3, the display 4, and the holder 9 are integrally assembled 1, and then the resultant assembly is assembled to the chassis 2, inward projection sections 2*a* formed on a right and a left side plates of the chassis 2 press the turned lug 93*b* of each of the resilient lugs 93 as shown in FIG. 7, and thus the resilient lug sections 93*a* come to hold more firmly the display 4 from right and left. Furthermore, when the cover 8 is assembled to the chassis 2, an inward projection section 8*a* formed on the cover 8 abuts against the projection section 94*b* formed on the back face of the resiliently engaging claw 94 as shown in FIG. 8, and thus the resiliently engaging claw 94 is inwardly pressed to press strongly the display 4 to the side of the bottom face of the holder 9. As a result, it is possible to hold more firmly the assembly of the indictor 4 to the holder 9.

As described above, according to the present invention, the display is arranged to be urged from three directions as follows: in the thickness direction, the display mounted on the holder is held in a specific position by sandwiching the holder by the resilient lugs working as the thickness-directionally urging unit and the resiliently engaging claws serving as the face pressing unit; in the downward direction, the display is pressed to the side of the terminal by the resilient lugs working as the mono-directionally urging unit; and in the rightward and leftward direction, the display is pressed and held by the resilient lugs functioning as the rightwardly and leftwardly urging unit. Thus, a heavyweight display having terminals can be firmly fixed to the holder. Moreover, even if the display is subjected to vibration and impact, the display can be restrained from movement, and there is obtained an advantageous effect that the occurrence of broken terminals due to the misregistration of the display can be prevented.

Furthermore, it is arranged such that in the case where the projections are provided on the outer faces of the resilient engaging claws working as the face pressing unit and the resilient lugs serving as the rightwardly and leftwardly urging unit, when the holder holding the display is assembled within the chassis, the inner face of the chassis or other external components abut against the projections thereof to press inwardly the resiliently engaging claws and the resilient lugs. Thus, it is possible to strengthen further the holding of the display by the resiliently engaging claws and the resilient lugs.

INDUSTRIAL APPLICABILITY

The display securing structure according to the present invention has an advantageous effect, such that a heavyweight display having a terminal can be secured surely to a holder, and thus, it is suitable for use in a heavyweight display such as vacuum fluorescent tube.

The invention claimed is:

1. A display securing structure comprising: a display having a terminal, and a holder to which the display is assembled, wherein the display has a rectangular shape with a thickness, and wherein the holder includes:

- a thickness-directionally urging unit formed on a bottom plate of the holder to urge the display mounted thereon in the direction of thickness of the display;
- a mono-directionally urging unit formed on a backside plate thereof to urge the display to the side of the terminal;
- a rightwardly and leftwardly urging unit formed on a left and a right side plates thereof to urge the display from left and right; and
- a face pressing unit formed on the backside plate and the right and the left side plates to press the face of the display.

2. The display securing structure according to claim 1, wherein the rightwardly and leftwardly urging unit has a resilient lug section for abutting against the display and a projection section formed on an outer face of the resilient lug section to abut against an external component.

3. The display securing structure according to claim 1, wherein the face pressing unit has a resiliently engaging claw for pressing the face of the display and a projection section formed on an outer face of the resiliently engaging claw to abut against an external component.

* * * * *